(12) United States Patent
Dolce

(10) Patent No.: US 8,294,101 B2
(45) Date of Patent: Oct. 23, 2012

(54) NET SOLAR RADIOMETER WITH THERMALLY BALANCED SPECTRAL RESPONSE

(75) Inventor: Robert Dolce, Manorville, NY (US)

(73) Assignee: AccuFlux Inc., Bohemia, NY (US)

( * ) Notice: Subject to any disclaimer, the term of this patent is extended or adjusted under 35 U.S.C. 154(b) by 313 days.

(21) Appl. No.: 12/876,117

(22) Filed: Sep. 4, 2010

(65) Prior Publication Data

US 2012/0056090 A1    Mar. 8, 2012

(51) Int. Cl.
*G01J 5/00*    (2006.01)
(52) U.S. Cl. .................... 250/338.1; 250/338.3
(58) Field of Classification Search ............. 250/338.1, 250/338.3
See application file for complete search history.

(56) References Cited

U.S. PATENT DOCUMENTS

| | | | |
|---|---|---|---|
| 3,054,841 A | 9/1962 | Fritschen |
| 3,098,380 A | 7/1963 | Suomi |
| 3,348,047 A | 10/1967 | Clifford |
| 3,355,589 A | 11/1967 | Clifford |
| 3,576,996 A | 5/1971 | Stevens |
| 3,802,925 A | 4/1974 | Suga |
| 3,819,419 A | 6/1974 | Loose |
| 4,166,390 A | 9/1979 | Benzinger |
| 7,154,077 B2 | 12/2006 | Miklatzky |

FOREIGN PATENT DOCUMENTS

| | | |
|---|---|---|
| CN | 2690867 | 4/2005 |
| CN | 10118182 | 2/2008 |
| JP | 2008096165 | 4/2008 |
| NL | 2005813 A | 3/2012 |
| NL | 2005814 A | 3/2012 |
| SU | 212574 | 12/1968 |

OTHER PUBLICATIONS

Campbell Scientific. "NR-Lite2 Net Radiometer". Copyright 1998-2012.*
Search Report and Written Opinion, Dutch Patent Application No. NL2005813, Netherlands Ministry of Economic Affairs, Agriculture and Innovation, Jul. 6, 2012.
Search Report and Written Opinion, Dutch Patent Application No. NL2005814, Netherlands Ministry of Economic Affairs, Agriculture and Innovation, Jul. 9, 2012.

(Continued)

*Primary Examiner* — David Porta
*Assistant Examiner* — Casey Bryant
(74) *Attorney, Agent, or Firm* — Alan M. Flum; Stone Creek LLC

(57) ABSTRACT

Disclosed is a net radiometer that measures the net difference between incoming solar and outgoing terrestrial radiant flux energy in the combined short-wave and long-wave far infrared spectral range. In accordance with principles of the invention, a balanced net radiometer can be constructed where each thermal absorber is formed from two separate pieces joined together to form a single thermal mass. Within each thermal absorber, each piece is coated with a separate surface coating of different spectral sensitivity. By constructing an absorber from two separate pieces, it is possible to apply spectral coatings with different curing characteristics, to thermal absorber that acts as a single thermal mass. The pieces within each thermal absorber are sized in a proportion that thermally balances the absorber's thermal sensitivity between short-wave and long-wave far infrared radiant energy.

15 Claims, 9 Drawing Sheets

OTHER PUBLICATIONS

Pedro Gavilan, Joaquin Berengena, Richard G. Allen, "Measuring versus estimating net radiation and soil heat flux: Impact on Penman—Monteith reference ET estimates in semiarid regions", Agricultural Water Management, May 10, 2007, pp. 275-286, vol. 89, Issue 3, Elsevier.

Granberg, Hardy B., "An Inexpensive Net Radiometer for Multipoint Spatial Surveys", Review of Science Instruments, Dec. 1989, pp. 3796-3801, vol. 60, No. 12, American Institute of Physics, New York, US.

"NR Lite Net Radiometer", Jan. 1, 2009, Kipp and Zonen B.V., Netherlands.

"CNR 4 Net Radiometer Instruction Manual", Jan. 1, 2009, Kipp and Zonen B.V., Netherlands.

Kipp and Zonen Net Radiometers for Measurement of Energy Balance, Publication Date Unknown, The Netherlands. pp. 2, 4.

Eplab Black and White Pyranometer Model 8-48 Datasheet, Publication Date: at least as early as Mar. 2004.

Fischer Product Datasheet No. 461105 Starpyranometer Edition: 1, Apr. 2005, pp. 1-3, Germany.

Douglas R. Cobos, John M. Baker, Evaluation and Modification of a Domeless Net Radiometer, Agronomy Journal, pp. 181-183, vol. 95, Jan.-Feb. 2003.

Hardy B. Granberg, Adrew Nadeau, An Inexpensive Net Radiometer for Multipoint Spatial Surveys, Review Scientific Instruments 60, 3796 (1989) (Abstract).

J.A. Brotzge, C.E. Duchon, A Field Comparison among a Domeless Net Radiometer, Two Four-Component Net Radiometers, and a Domed Net Radiometer, Journal of Atmospheric and Oceanic Technology vol. 17, Dec. 2000, pp. 1569, 1577-1582.

Bernardo A. Carnicero Domiguez, Characterization of Pyranometer Thermal Offset and Correction of Historical Data, Master's Thesis, Virginia Polytechnic Institute, Jun. 15, 2001. (Abstract).

Delta Ohm Product Catalog, LP Net 07 on p. 17, Publication Date Unknown.

Mark Blonquist, Bert Tanner, Bruce Bugbee, Comparison of Two New Net Radiometers, Presentation, Publication Date Unknown. pp. 1, 3, 7-8, 12, 21-23.

\* cited by examiner

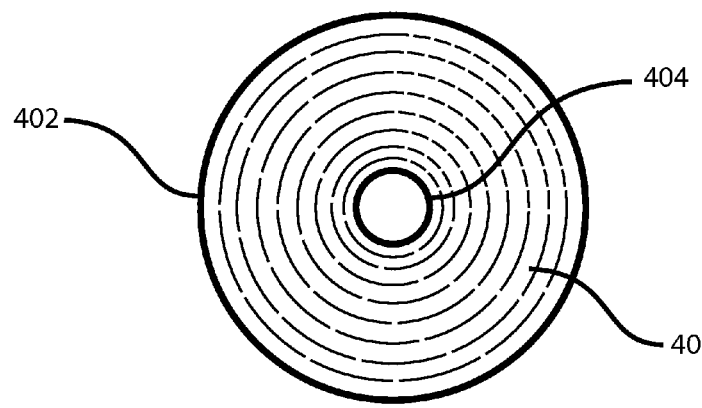
FIG. 4
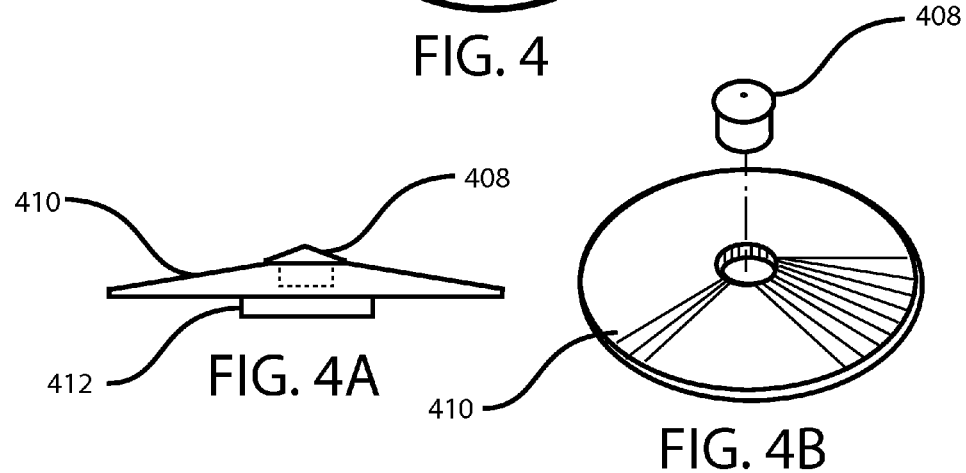
FIG. 4A
FIG. 4B

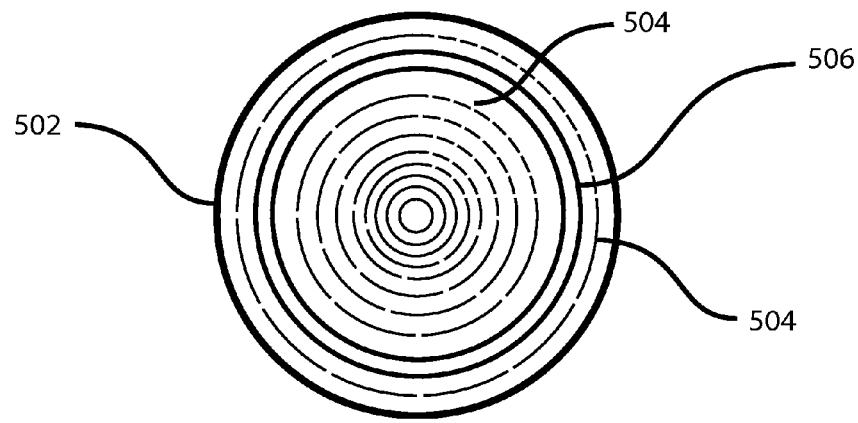
FIG. 5
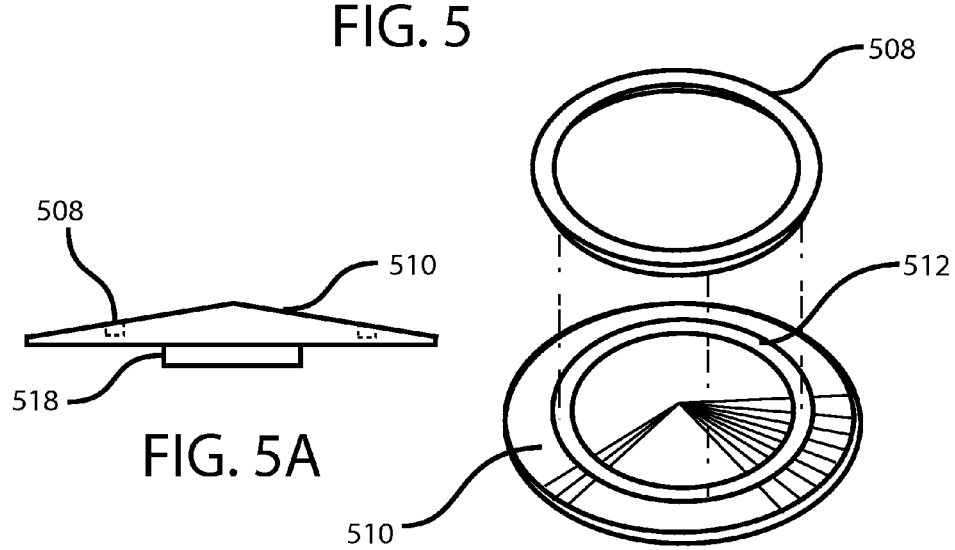
FIG. 5A
FIG. 5B

NET SOLAR RADIOMETER WITH THERMALLY BALANCED SPECTRAL RESPONSE

BACKGROUND

The present invention relates to a class of testing and measuring meteorological instruments or apparatus that measure naturally occurring solar radiant energy and reflected or emitted terrestrial radiant energy. Specifically, the field of invention is a class of instruments, known as net radiometers, which measure the net difference between incoming solar and outgoing terrestrial radiant energy in the combined short-wave and long-wave far infrared spectral range.

Net radiometers are an important instrument for global climate change research and agro-meteorology. For global climate change research, net radiometers are typically used in glacial studies where they are used to monitor the net loss of energy on an ice sheet. Net radiometers have also been placed on forest floor and above the forest canopy, in combination, to study correlations between biological activity and net energy flux. For agro-meteorology, net radiometers are typically used with a combination of other metrological instruments to measure loss of water in wetlands such as the Everglades or to control irrigation in large farms.

Net radiometers measure the difference between total incoming solar radiant energy and outgoing terrestrial radiant energy. Total incoming solar radiant energy is a combination of incoming short-wave radiant energy from the sun and down-welling long-wave far infrared radiant energy from the sky. Outgoing terrestrial radiant energy is a combination of reflected short-wave radiant energy, and up-welling far infrared radiant energy from the ground.

Typically in the daytime, the majority of net radiant energy contribution comes from incoming short-wave radiant energy from the sun. At night the majority of net radiant energy contribution typically comes from up-welling long-wave far infrared radiant energy from the ground. Short-wave radiant energy is generally defined as radiant energy in the near-ultraviolet, visible, and near-infrared wavelengths. The spectral range is approximately 200 to 4000 nm. Any radiant up-welling or down-welling energy with a spectral range of approximately 4000 nm to 50,000 nm is referred to as long-wave far infrared radiant energy.

Two examples of net radiometer types are four-absorber and two-absorber net radiometers. A two-absorber net radiometer includes a single pair of virtually identical thermal absorbers, one upward facing and the other downward facing. Each thermal absorber is thermally responsive across the short-wave radiant energy and long-wave far infrared radiant energy spectra. The upward facing thermal absorber absorbs radiant energy from the sky while the downward facing thermal absorber absorbs radiant energy either emitted or reflected from the ground.

A four-absorber net radiometer includes two pairs of absorbers. One pair is responsive only to short-wave radiant energy. The other pair is responsive only to long-wave far infrared radiant energy. Each pair has an upward facing and downward facing thermal absorber. While the pairs of absorbers are different from each other, each pair having a different spectral sensitivity, within each pair the absorbers are virtually identical.

Two-absorber net radiometers have a nighttime measurement error up to 13% when compared to their four-absorber counterparts. Information relevant to attempts to address this problem can be found in Cobos, Douglas R. and Baker, John M. Evaluation and Modification of a Domeless Net Radiometer, Agronomy Journal, Vol. 95 (January-February 2003), pp. 180-183. However, that reference does not teach how to solve the problem for a permanent hydrophobic coating nor does it teach the correct coating proportion.

Improvements in the art are always desirable therefore there is a need for a two-absorber net radiometer where the error in nighttime measurement is minimized.

SUMMARY

Two absorber net radiometers typically have uncovered absorbers so they can be fully responsive to both short-wave radiant energy and long-wave far infrared radiant energy. Subsequently the thermal absorbers are exposed to the elements, so a water resistive or hydrophobic coating is required to protect them. PTFE (Polytetrafluoroethylene), often sold under the brand name Teflon, has excellent water repellent or hydrophobic properties making it a desirable surface coating. Black PTFE absorbs and or emits long-wave far infrared radiant flux energy, while also capable of absorbing short-wave radiant flux energy. Through a series of careful experiments, the inventor verified that black PTFE is spectrally more sensitive to short-wave radiant flux energy and therefore is not spectrally balanced. Since most of the radiant energy at night up-wells from the ground as heat in the form of long-wave far infrared radiant energy to cold space above, two absorber net radiometers being under sensitive to long-wave far infrared energy would exhibit a nighttime measurement error resulting from reduced sensitivity to long-wave far infrared radiation, either received or emitted.

The inventor, through a series of careful experiments, discovered that source of the nighttime measurement error in two-absorber net radiometers is a combination of imbalance in the spectral response of the thermal absorber's water resistant coating and asymmetry between the top and bottom absorber sensitivity. Two-absorber net radiometers typically use thermopiles to create an electrical voltage that is proportional to the difference in thermal response to radiant energy between the upward facing and downward facing absorbers. The asymmetry is caused by the construction of the thermopile.

White PTFE reflects away short-wave radiant flux energy, while absorbing and or emitting long-wave far infrared radiant flux energy. Black and white PTFE coatings have different curing times and/or curing temperatures making it difficult or impractical to apply to the same net radiometer absorber surface. This problem was recognized by the inventor and not recognized in any of the prior art.

Based on these observations by the inventor, in accordance with principles of the invention, a balanced net radiometer can be constructed where each thermal absorber is formed from two separate pieces joined together to form a single thermal mass. Each piece is separately coated before joining. Within each thermal absorber, each piece is coated with a separate surface coating of different spectral sensitivity. By constructing an absorber from two separate pieces, it is possible to apply spectral coatings with different curing characteristics, to thermal absorber that acts as a single thermal mass. The pieces within each thermal absorber, are sized in a proportion that thermally balances the absorber's thermal sensitivity between short-wave and long-wave far infrared radiant energy.

In addition, based on the inventors observation that the source of a general asymmetry between identically constructed upper absorbers and lower absorbers in many commercial two-way net radiometers is because of an asymmetry in net radiometer's thermopile construction, a net radiometer based on principles of the invention, can be constructed where the thermal absorber pieces are proportioned to compensate for this effect.

While, the invention was motivated by the discovery of the source of a problem found in two-way domeless net radiometers, it is also possible to direct the invention to domed versions, where each dome is made of a material that does not filter long-wave far infrared radiant energy. It may be desirable to have a protective absorber under a dome. In a hostile environment, birds can peck holes in the dome, a weather-resistant coated absorber would allow the device to still operate even if the dome were compromised.

DRAWINGS

These and other features, aspects, and advantages of the present invention will become better understood with regard to the following description, appended claims, and accompanying drawings where:

FIG. 4 shows a top view of a thermal absorber embodying features of the invention including a central concentric portion reflecting short-wave radiant energy and an outer concentric portion absorbing both long-wave far infrared and short-wave radiant energy.

FIG. 4A shows a side view of a thermal absorber embodying principles of FIG. 4

FIG. 4B shows a perspective view of a thermal absorber embodying principles of FIG. 4.

FIG. 5 shows a top view of a thermal absorber embodying features of the invention including a portion absorbing long-wave far infrared radiant energy and reflecting short-wave radiant energy formed by a concentric ring.

FIG. 5A shows a side view of one embodiment of a thermal absorber embodying the principles of FIG. 5.

FIG. 5B shows a perspective view of one embodiment of a thermal absorber embodying the principles of FIG. 5.

DESCRIPTION

Figure 1:
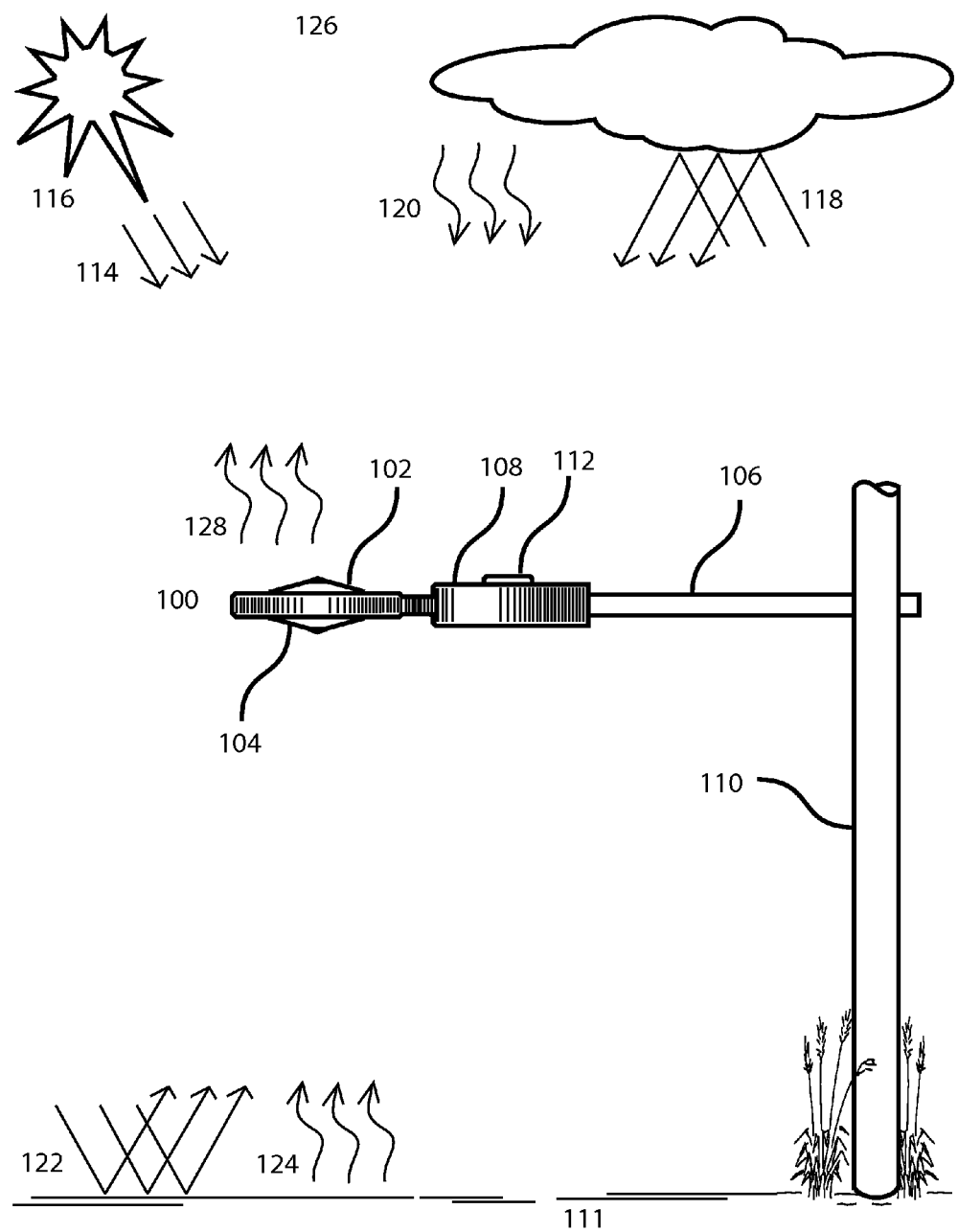
FIG. 1 shows a net radiometer embodying features of the invention in a typical operating environment.

Referring now to the drawings in detail wherein like numerals indicate like elements throughout the several views, FIG. 1 shows a net radiometer embodying principles of the invention and operating in a typical outdoor environment. Net radiometer 100 includes an upper thermal absorber 102 and lower thermal absorber 104 that are mounted 180 degrees in opposition. This allows for the upper thermal absorber 102 to face horizontally upward while the lower thermal absorber 104 faces horizontally downward. In the illustrated embodiment, a mounting rod 106 is screwed into the net radiometer body 108. The mounting rod is in turn connected to a mounting pole 110 that is secured into the surface of the ground 111. A bubble level 112 is used to assure that the net radiometer is horizontally level.

During the day, most of the energy received by the net radiometer 100 comes from short-wave radiant energy 114 from the sun 116 falling on the upper thermal absorber 102. In addition, the upper thermal absorber 102 receives sky reflected diffuse short-wave radiant energy 118 and down-welling long-wave infrared radiant energy 120. The lower thermal absorber 104 receives daytime thermal radiant energy from a combination of ground reflected short-wave radiant energy 122 and up-welling far infrared radiant energy 124 from the ground 111.

At night, the radiant energy received or emitted by the net radiometer 100 up and down-looking absorbers is typically dominated by long-wave radiative flux exchange, that is up-welling far infrared radiant flux energy 124 from the ground 111 received by the lower thermal absorber 104, or vice versa, and the long-wave radiative flux exchange between the upper absorber 102 and the sky above 126.

Referring to FIG. 1, FIG. 2A, FIG. 2B, and FIG. 3, the upper thermal absorber 102 is divided into two separate thermal absorber pieces or portions; a larger portion 202 and a smaller portion 204. The two portions are joined together to form a single thermal mass. Both portions of the upper thermal absorber are made of a heat conductive material such as metal as aluminum, brass, copper, or a composite with good thermal conductive properties. In a preferred embodiment, the material is aluminum. The larger portion 202 is coated with a material that enables it to be capable of absorbing and converting to heat, sun generated short-wave radiant flux energy 114, sky reflected diffuse short-wave radiant flux energy 118, and down-welling long-wave infrared radiant flux energy 120. The smaller portion 204 is coated with a material that enables it to be capable of absorbing the down-welling long-wave infrared radiant flux energy 120 and reflecting away sun generated short-wave radiant energy 114, and sky reflected short-wave radiant energy 118. Heat flows together from the larger portion 202 and smaller portion 204 of the upper thermal absorber 102 to present a spectrally balanced single thermal profile to the upper surface of the thermopile 206.

Similarly, the lower thermal absorber 104 is divided into two portions, a larger portion 208 and a smaller portion 210. As with the upper thermal absorber 102, the larger portion 208 and smaller portion 210 are formed from two separate pieces, joined together to form a single thermal mass. The lower thermal absorber 104 is constructed in such a way as to create nearly an identical thermal profile as upper thermal absorber 102. In the illustrated embodiment of FIG. 2A, FIG. 2B, and FIG. 3 this is accomplished by using nearly identically constructed absorbers. The larger portion 208 is coated with a material that enables it to capable of absorbing and converting to heat, ground reflected short-wave radiant energy 122 and up-welling far infrared radiant energy 124 from the ground 111. The smaller portion 210 is coated with a material that enables it to be capable of absorbing up-welling far infrared radiant energy 124 from the ground 111 and reflecting away ground reflected short-wave radiant energy 122. Heat flows together from the larger portion 208 and smaller portion 210 of the lower thermal absorber 104 to present a spectrally balanced single thermal profile to the lower surface of the thermopile 206.

The thermopile 206 produces a voltage output that is proportional to the temperature difference between its upper thermal absorber 102 and lower thermal absorber 104 surfaces. It follows that the thermopile 206 produces an output voltage that is proportional to the difference in radiant energy falling on or emitted by the upper thermal absorber 102 and lower thermal absorber 104, because the thermopile upper surface 312 is thermally coupled to the upper thermal absorber 102 and the thermopile lower surface 314 is thermally coupled to the lower thermal absorber 104. The voltage is carried by a pair of wires 316 through a channel 220 in the net radiometer body 108.

The response time of the net radiometer is in part determined by the rate of time required to restore both the upper absorber 102 and lower absorber 104 temperatures to equilibrium with the net radiometer housing 108 temperature, if the radiative source where removed entirely. At the same time, for the radiometer to have effective sensitivity, it must be able to channel radiative energy striking or emitted by the upper thermal absorber 102 and lower thermal absorber 104 to the thermopile 206.

Referring again to FIG. 2A, FIG. 2B, and FIG. 3, part of the outer edge of the larger portion 202 is in thermal contact with net radiometer body 108. The net radiometer body 108 is also made of a thermally conductive material, such as aluminum, and acts as a heat sink, conducting away heat from the absorber and dissipating the heat to the surrounding environment. The bottom face of the central part of the larger portion 202 is in contact with the centric portion of the upper face of a first thermally conductive disc 212. A first thermally insulative spacer 214 aligns the central part of the larger portion 202 approximately with the center of the first thermally conductive disc 212. The first thermally insulative spacer 214 is made of a material that poorly conducts heat but is not damaged by heat such nylon, polyoxymethylene (often sold under the brand name Delrin), or other thermal plastic materials. The outer edge of the first thermally conductive disc 212 is in thermal contact with an interior portion of the net radiometer body 108. The lower face of the center portion of the first thermally conductive disc 212 is in contact with the upper face of a thermopile 206. There are several effects of this arrangement. First, heat that is a result of radiant energy striking the surface of the upper thermal absorber 102 is channeled to the upper face of the thermopile 206. Second, this heat is quickly dissipated to the net radiometer body 108 so that the upper thermal absorber 102 is more responsive to changes in radiant energy striking its surface.

Similarly, part of the outer edge of the larger portion 208 of the lower thermal absorber 104 is in thermal contact with net radiometer body 108. The inward facing surface of the central part of the larger portion 208 is in contact with the centric portion of the downward facing surface of a second thermally conductive disc 216. A second thermally insulative spacer 218 aligns the inward facing central part of the larger portion 208 approximately with the center of the second thermally conductive disc 216. The outer edge of the second thermally conductive disc 216 is in thermal contact with an interior portion of the net radiometer body 108. The inward facing surface of the center portion of the second thermally conductive disc 216 is in contact with the bottom face of a thermopile 206.

Figure 3:
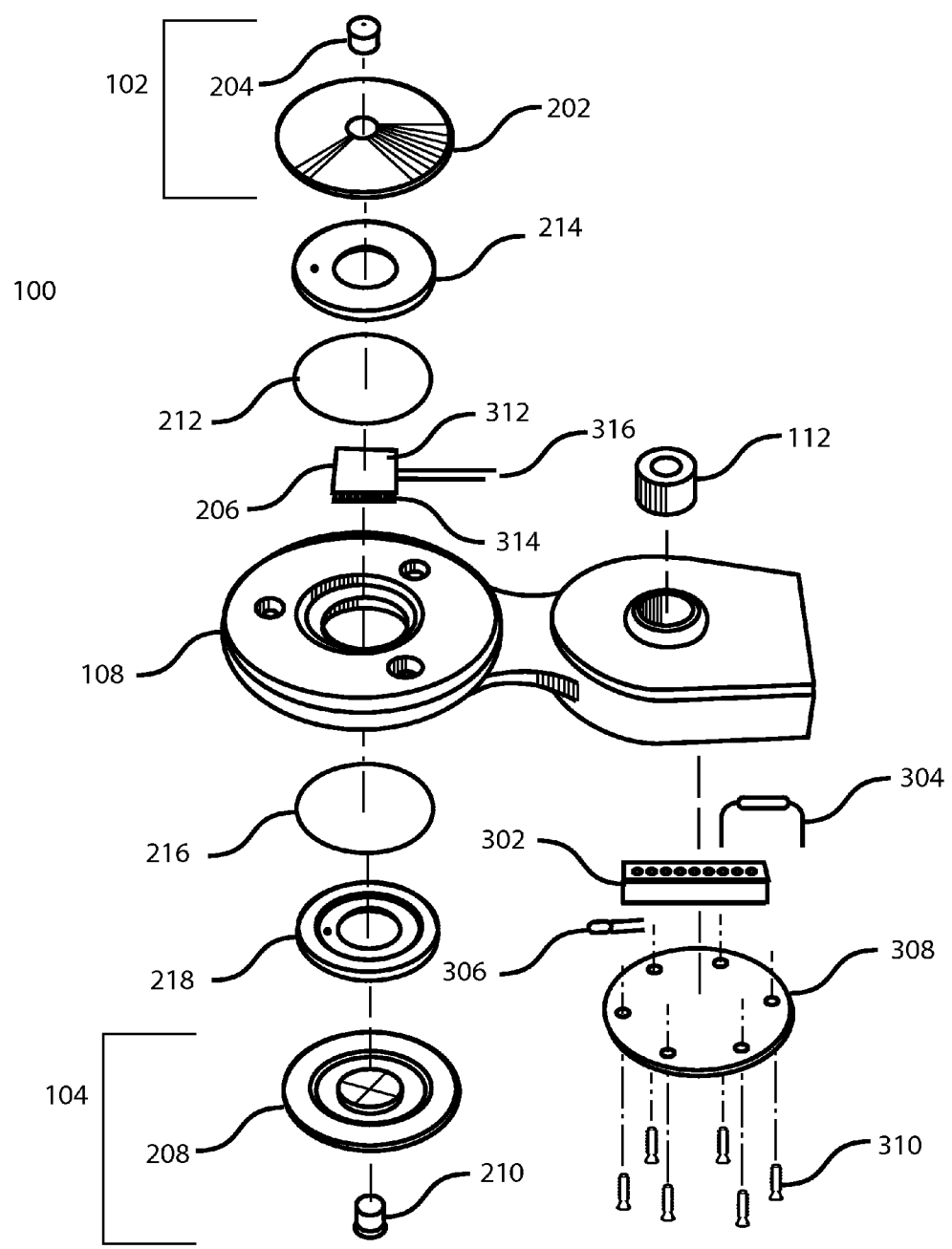
FIG. 3 shows an exploded perspective view of an embodiment of the net radiometer shown in FIG. 2.

Some thermopiles have a small imbalance in sensitivity between from one side or face to the next. This is a caused by the construction of the thermopile. Referring to FIG. 3, the wires 316 connected to the thermal junctions are often routed closest to one face. The wires 316 conduct away a small portion of the thermal energy. Because of this, the face of the thermopile closest to wires 316 loses thermal sensitivity because the wires act as a heat sink. In a preferred embodiment, the inner portion and outer portion of both absorbers are sized to account for the loss in sensitivity caused by wires. The thermal absorber upper face 312 that is thermally coupled to the upper absorber 102 is the side closest to the wires.

FIG. 4, FIG. 4A, FIG. 4B, FIG. 5, FIG. 5A, and FIG. 5B show several net radiometer thermal absorbers embodying principles of the invention where each thermal absorber is formed from two absorber pieces joined together to form one thermal mass, each absorber piece within each thermal absorber is coated with a hydrophobic coating with different spectral sensitivities, and each absorber piece is proportioned in order to thermally balance the absorber's spectral sensitivity between short-wave and long-wave far infrared radiant energy.

FIG. 4 shows a top view of a thermal absorber embodying principles of the invention. The thermal absorber 402 is divided into absorber pieces or two concentric portions: a smaller centric portion 404 and a larger outer portion 406. The centric portion 404 is coated with a material that enables it to absorb and or emit long-wave infrared radiant flux energy, while reflecting away short-wave radiant flux energy. The outer portion 406 is coated with a material that enables it to absorb and convert short-wave radiant flux energy to heat, while also absorbing and or emitting long-wave infrared radiant flux energy. The size of the centric portion 404 with respect to the outer portion 406 is proportioned so that a thermal balance is achieved with the thermal absorber 402 sensitivity to short-wave and long-wave far infrared radiant flux energies from perspective of the absorber bottom surface 412.

FIG. 4A and FIG. 4B show a side view and perspective view respectively of a thermal absorber embodying the principles of FIG. 4. In this embodiment, the absorber surface is coated with a material for the centric portion 404 that requires different application treatment than the outer portion 406. For example, the coating applied to the centric portion 404 might require a different curing temperature or curing time than the coating applied to the outer portion 406. In that scenario, it would be challenging to apply the coating to an absorber constructed from a single piece of metal. In FIG. 4A and FIG. 4B the inner portion 408 is constructed from a separate piece of metal than the outer portion 410. The outer portion 410 has a centric hole in order to accommodate insertion of the centric portion 408 with thermal contact. The two pieces are typically joined together with a thermally conductive adhesive or thermal bonding agent. Alternatively, the two pieces can be joined by tightly press fitting them together. Both methods of joining effectively create a single thermal mass from the two separate absorber pieces.

PTFE (Polytetrafluoroethylene), often sold under the brand name Teflon, has excellent water repellent or hydrophobic properties making it a desirable surface coating. Black PTFE absorbs and or emits long-wave far infrared radiant flux energy, while also capable of absorbing short-wave radiant flux energy. However, black PTFE is spectrally more sensitive to short-wave radiant flux energy and therefore is not spectrally balanced. A net radiometer with absorbers coated only with black PTFE would exhibit a nighttime measurement error. White PFTE reflects away short-wave radiant flux energy, while absorbing and or emitting long-wave far infrared radiant flux energy. A net radiometer, embodying the principles of the invention, can minimize any nighttime measurement error by applying to each absorber a portion coated with black PTFE and a portion coated with white PTFE in a proportion that thermally balances the absorber's thermal sensitivity between short-wave and long-wave far infrared radiant flux energy.

Black and white PTFE coatings have different curing times and temperatures making it difficult to apply to the same surface. An embodiment of the thermal absorber of FIG. 4A and FIG. 4B in accordance with principles of the invention, solves this problem of applying the two surface coatings to a single thermal mass. Black PTFE is applied as a surface coating on the outer portion 410 and white PTFE is applied as a surface coating on the centric portion 408. The two pieces are joined together as previous described and as shown in FIG. 4A to form a single thermal mass. In the illustrated embodiment, using a formulation of black PTFE on the outer portion 410, and a formulation of white PTFE on the centric portion 408, the surface area of the outer portion 410 is approximately 30 times the surface area of the centric portion 408.

In the embodiment of FIGS. 4A and 4B, the outer portion 410 and centric portion 408 are both conically pitched in order to encourage moisture run-off. In addition, the centric portion 408 has a slightly greater conical pitch angle than the outer portion 410 in order to prevent moisture accumulation at the junction of the two portions. The conical pitch angle is a tradeoff between the prevention of water accumulation and directional measurement error effect resulting from short-wave radiant flux energy striking a non-planer absorber surface. The conical pitch angle that is a balance of these two factors is typically between 5 and 15 degrees on the outer portion 410 and 10 to 25 degrees on the centric portion 408.

FIG. 5 shows net radiometer thermal absorbers embodying principles of the invention where the portion that reflects short-wave radiant flux energy forms a concentric ring. FIG. 5 is a top view of the thermal absorber 502 with a main portion 504 that absorbs and or emits long-wave far infrared radiant flux energy, while absorbing short-wave radiant flux energy, with a concentric ring portion 506 that absorbs and or emits long-wave far infrared radiant flux energy while reflecting away short-wave radiant flux energy.

FIG. 5A is a side view and FIG. 5B a perspective view of thermal absorber embodying the principles of FIG. 5 where concentric ring portion 508 is a separate metal ring that is inserted into the main portion 510. This allows for the application of coating materials, such as PTFE, where the black coating applied to the main portion 510 has different curing requirement as the white coating applied to the concentric ring portion 508. After the coatings are applied, the concentric ring portion 508 is inserted into a concentric groove 512 and bonded to main portion 510 with a thermally conductive adhesive. As shown in the cross section of FIG. 5A, the top of the concentric ring portion 508 is pitched at an angle so that its surface is flush with the surface of the main portion 510.

In FIG. 5A and FIG. 5B, the concentric ring portion 506 and main portion 504 are proportioned so that the absorber presents thermal profile that is spectrally balanced between the long-wave far infrared and short-wave radiant flux energy at bottom face of the absorber 518.

The net radiometer thermal absorbers embodied in both FIG. 4 and FIG. 5 both have their absorber portions shaped and configured so each absorber portion is nearly equally exposed to the sun no matter the sun angle. This is preferred, otherwise complex measurement errors could be introduced based on time of day or time of year. One way to accomplish this is to have the absorber portions with approximate concentric symmetry so that the ratio of the short-wave radiant flux energy striking each portion is approximately the same no matter what the angle of incidence of the radiant flux energy.

Figure 2:
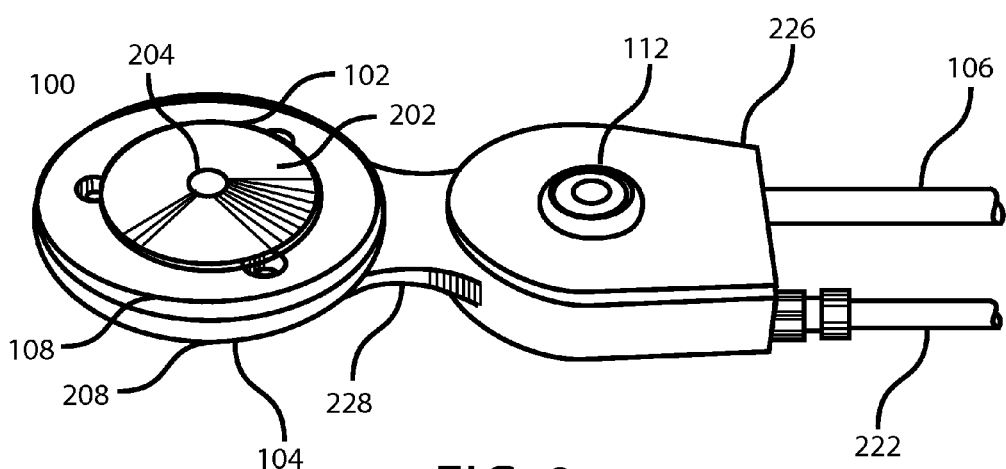
FIG. 2 shows a perspective view of a two-absorber net radiometer embodying principles of the invention.
Figure 2A:
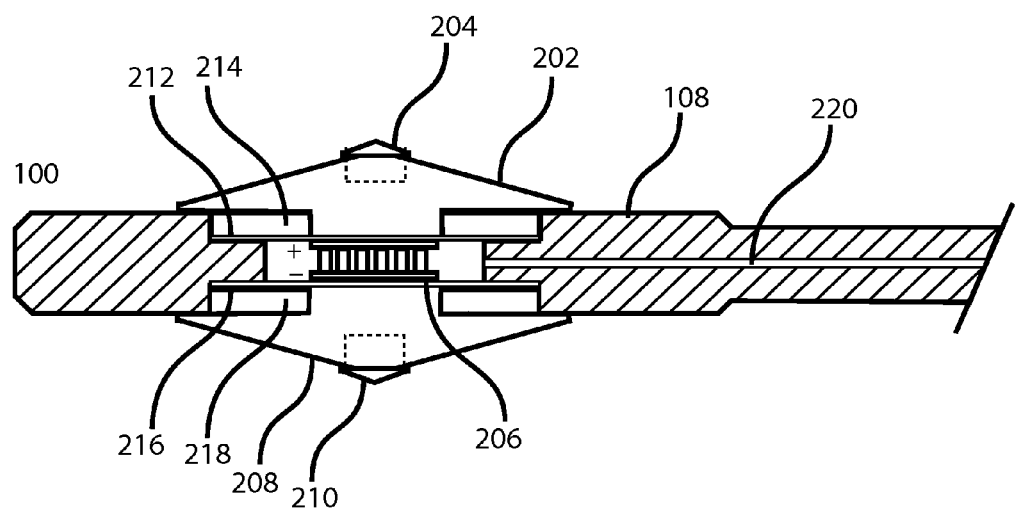
FIG. 2A shows a partial cross sectional view of the net radiometer shown in FIG. 2.
Figure 6:
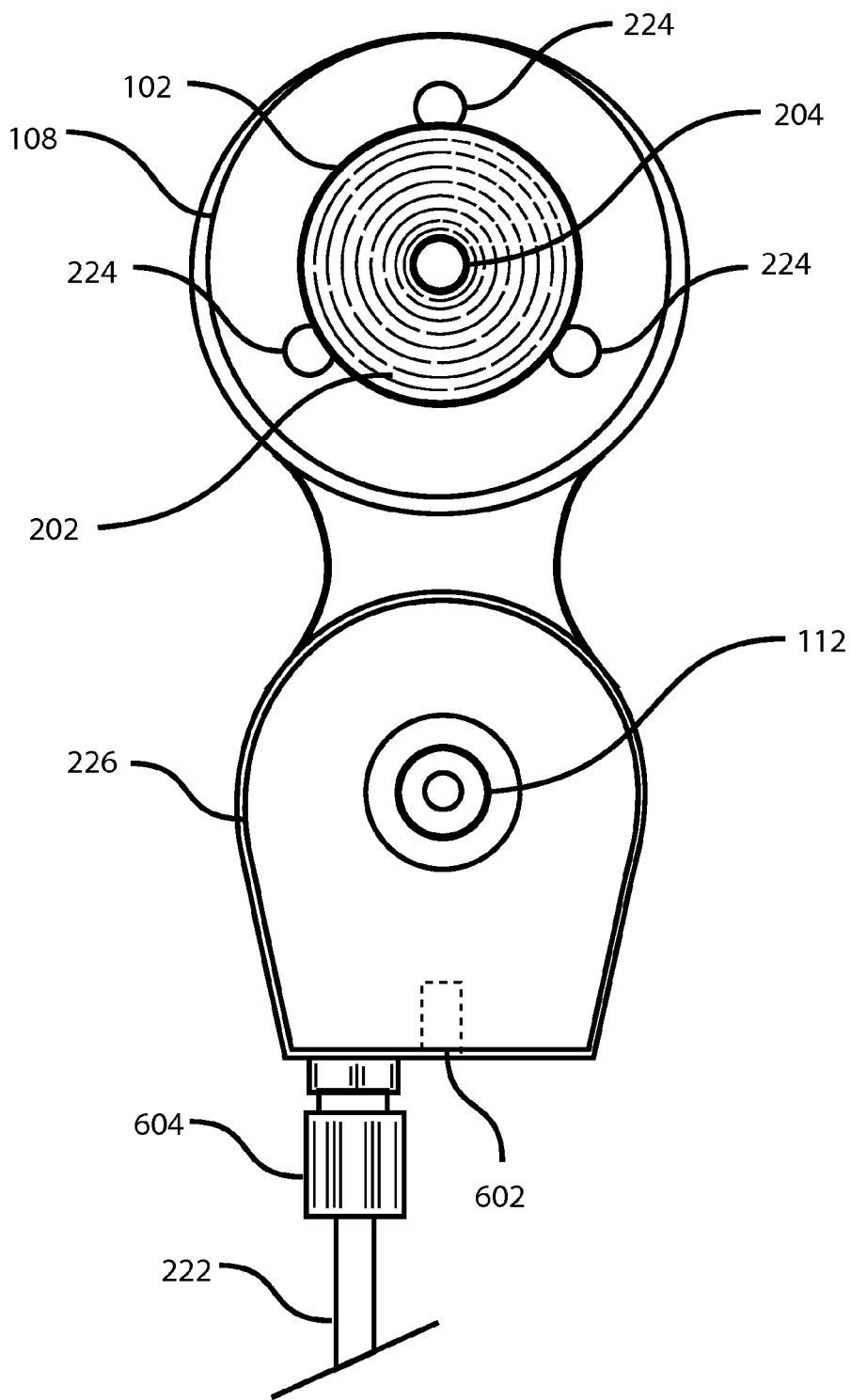
FIG. 6 shows a top view of an embodiment of the net radiometer shown in FIG. 2.

FIG. 6 shows a top view of an embodiment of FIG. 2. The upper thermal absorber 102 is shown with the larger portion 202 and smaller portion 204 configured like the absorber shown in FIG. 4. In addition, the net radiometer body 108 has moisture drainage holes 224 that slightly overlap the outer circumference of the upper absorber 102 in order to facilitate drainage. The instrument rear up-facing body section 226 has a bubble level 112 for helping to horizontally level the net radiometer. The cable 222 is connected to the body through a screw in weatherproof cable gland. The mounting rod 106 is screwed into a threaded hole 602 in the rear of the instrument body section 226.

Figure 7:
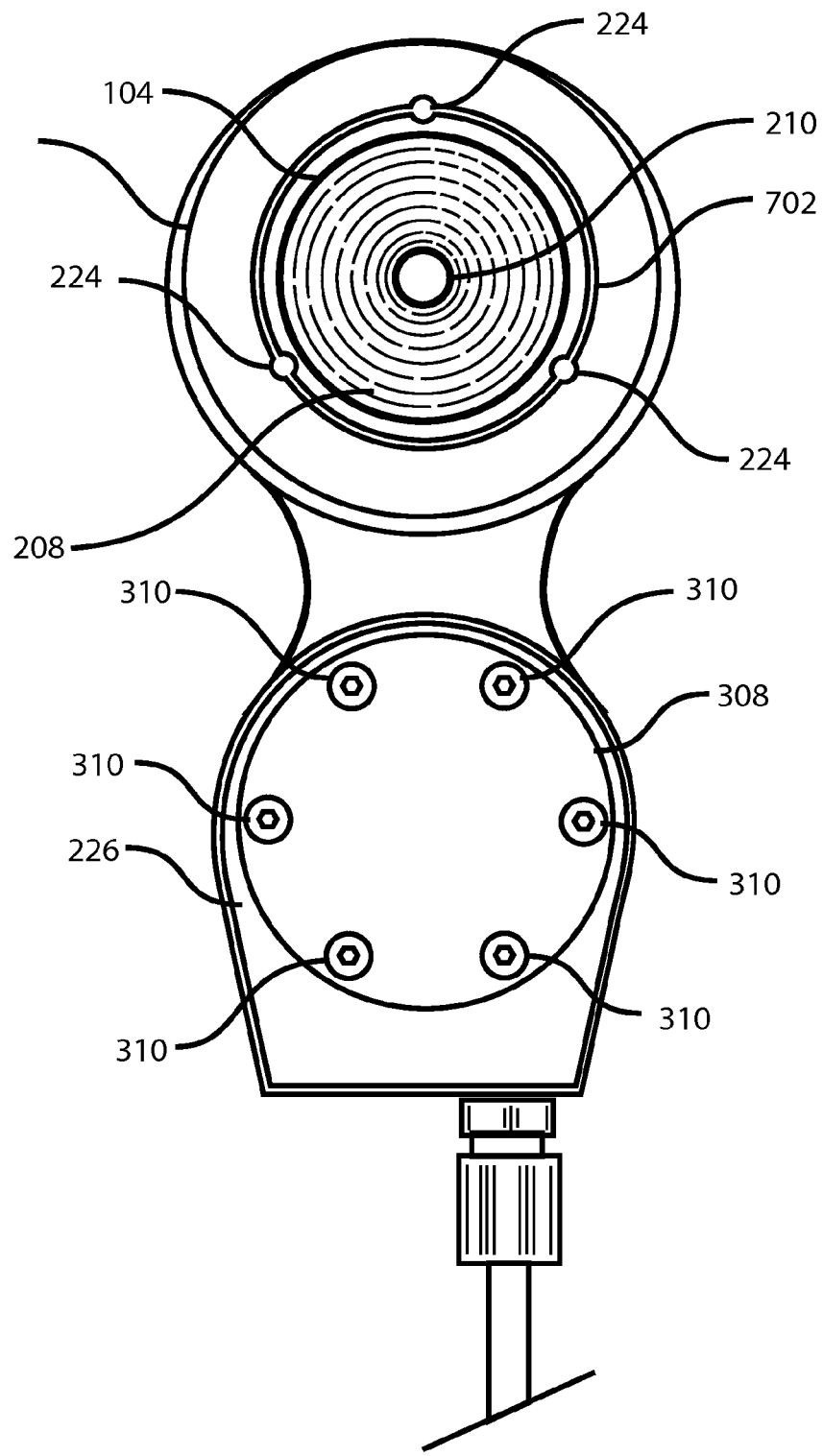
FIG. 7 shows a bottom view of an embodiment of the net radiometer shown in FIG. 2.

FIG. 7 shows a bottom view of the embodiment of FIG. 6. The lower thermal absorber 104 is substantially identical in size and construction to the upper thermal absorber 102 of FIG. 6 with the larger portion 208 having the same area and shape as the larger portion 202 of FIG. 5 and the smaller portion 210 having the same size and shape as the smaller portion 204 of FIG. 5. The net radiometer body 108 has groove 702 that prevents water coming through the drainage holes 224 from rolling back onto the centric portion of the lower thermal absorber 104.

The underside of the rear body section 226 has an access plate 308 that is fastened to the underside of the rear body section 226 by screws 310.

Figure 8:
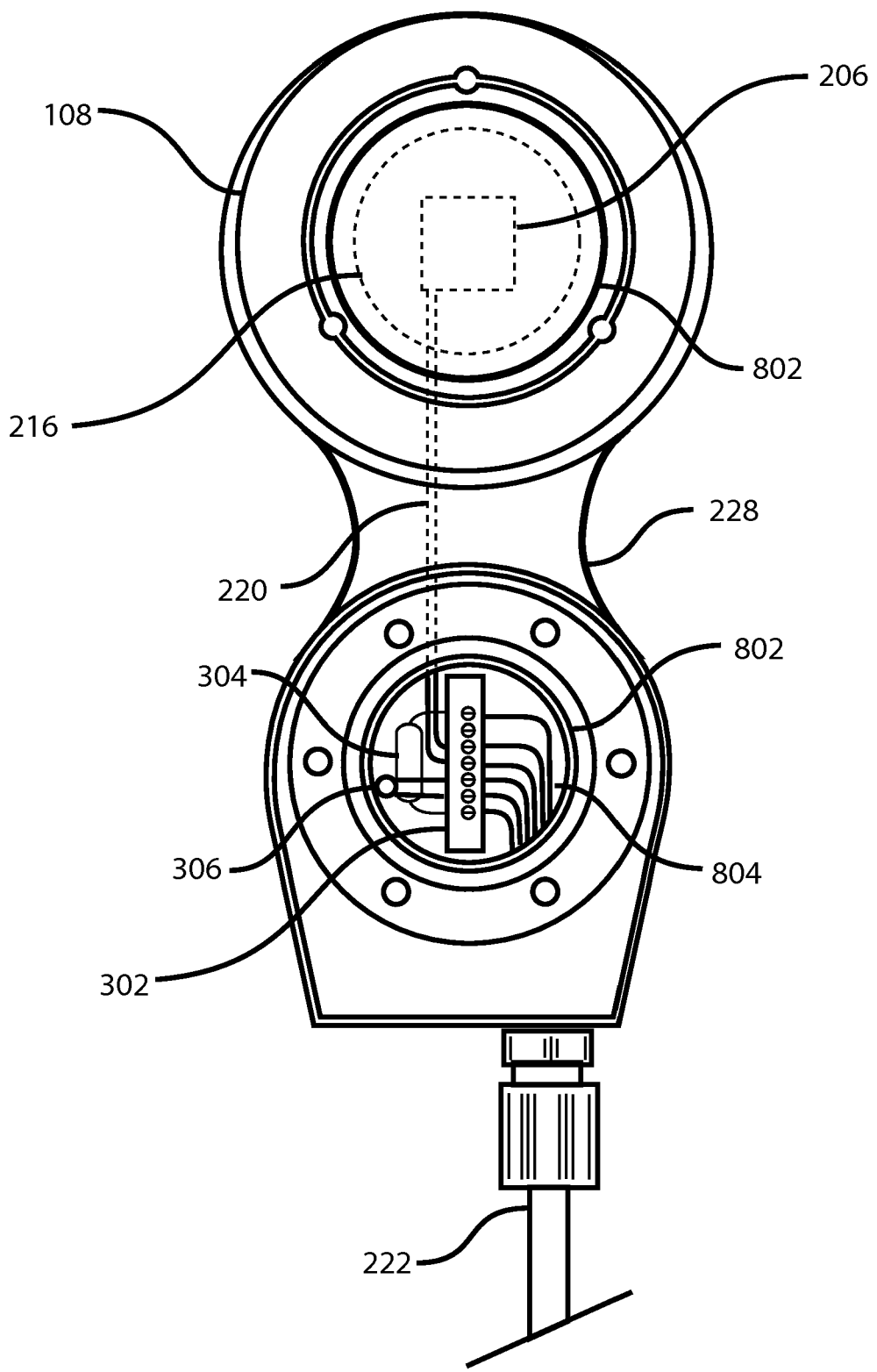
FIG. 8 shows a bottom view, featuring internal details, of an embodiment of the net radiometer shown in FIG. 2.

FIG. 8 shows a bottom view, featuring internal details, of the embodiment of FIG. 7. The access plate 308 of FIG. 7 is removed and detail of structure below the lower thermal absorber 104 is also revealed. FIG. 8 shows the outline of second conductive absorber disc 216 below the outline of lower absorber edge 802. The outline of the thermopile 206 is also shown in relation to both the second conductive absorber disc 216 and the lower absorber edge 802.

Referring to both FIG. 3 and FIG. 8, electrical signal wires 804 from the thermopile detector, which provide a voltage difference proportional to the thermal gradient across the thermopile 206 upper and lower surfaces, are channeled through the net radiometer body 108 through a channel 220 in the net radiometer neck 228. These thermopile electrical wires 804 connect to an electrical terminal block 302. The terminal block has two sides where connections on one side are electrically connected to the same terminal on the opposite side. Also attached to the same side of terminal block 302 is a thermistor for measuring temperature of the net radiometer body 108 and a resistor for heating the net radiometer body 108 in order to prevent dew formation. The other side of the terminal block has a set of signal wires 804 that carry the signals from the thermopile detector 206, the resistor 304, and the thermistor 306 to the external instrument signal cable 222.

Figure 9:
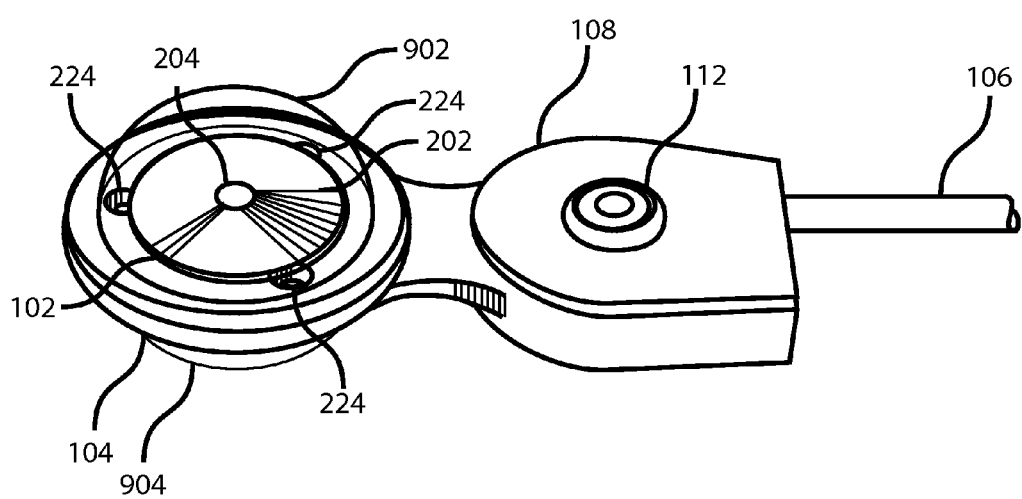
FIG. 9 shows a top perspective view of a domed two-absorber net radiometer embodying principles of the invention.

While the invention was motivated by the discovery of a source of a problem by the inventor that occurred with dome-less two-way net radiometers, it may also be desirable to create domed two-way net radiometers embodying principles of the invention. The dome must be made of a material that transmits both long-wave far infrared and short-wave radiant flux energy. FIG. 9 shows a top perspective view of domed two-way net radiometer embodying principles of the invention. The upper dome 902, in this embodiment covers the drainage holes 224, while the lower dome leaves the drainage holes 224 in the net radiometer body 108 exposed so that water can drain. The upper dome is larger than the lower dome in order to accommodate this arrangement. While the dome normally protects the thermal absorbers 102 104 from the elements, it is not uncommon for domes to become damaged or cracked from aggressive birds and other animals in hostile environments. Therefore, it is desirable for the absorbers to have water resistant coatings just like in the domeless net radiometers described in this disclosure.

The upper dome 902 and lower dome 904 are made of a material that does not filter out long-wave far infrared radiant flux energy. This is a critical element for a domed net radiometer. The smaller portion 204 and larger portion 202 are sized in a proportion in order to balance thermally the spectral response of the long-wave far infrared and short-wave radiant flux energy within each thermal absorber.

A net radiometer with the above mentioned objectives have been described. Those skilled in the art should appreciate that the invention is not intended to be limited to the preferred embodiments of the invention described within this disclosure. Various modifications will be apparent, particularly upon consideration of the teachings provided herein. Therefore, the invention should be understood to extend to the subject matter as defined in the following claims, and equivalents thereof.

What is claimed is:

1. An apparatus, comprising:
   a net radiometer including a thermal absorber;
   the thermal absorber formed from two separate pieces joined together to form a single thermal mass;
   each piece coated with a separate surface coating of different spectral sensitivity; and
   each piece proportioned to thermally balance spectral thermal sensitivity between short-wave radiant flux energy and long-wave far infrared radiant flux energy within the thermal absorber.

2. An apparatus of claim 1 wherein each piece is coated with a surface coating that has different curing temperatures or different curing times.

3. An apparatus of claim 1 wherein each piece is coated with a surface coating that has different curing temperatures and different curing times.

4. An apparatus of claim 1, wherein:
   the two separate pieces are a first piece and a second piece;
   the first piece having an area forming a substantially centric hole; and
   the hole disposed to receive the second piece.

5. A apparatus of claim 4, wherein:
   the first piece and second piece each have a conically pitched surface; and
   the conically pitched surface of the first piece is pitched at a different angle than the conically pitched surface of the second piece.

6. An apparatus of claim 5 wherein the thermal absorber is a first thermal absorber, and a second thermal absorber substantially identical in construction and mounted approximately 180 degrees in opposition.

7. An apparatus of claim 6, further comprising:
   a thermopile configured to generate an electrical voltage based on the difference in radiant energy received by the first thermal absorber and second thermal absorber.

8. An apparatus of claim 7, wherein:
   the thermopile includes a first thermopile surface and a second thermopile surface;
   the first thermopile surface is more sensitive to thermal energy than the second thermopile surface;
   the first thermal absorber is upward facing and the second thermal absorber is downward facing;
   the first thermal absorber is thermally coupled to the first thermopile surface; and
   the second thermal absorber is thermally coupled to the second thermopile surface.

9. An apparatus of claim 1 wherein the thermal absorber is a first thermal absorber and second thermal absorber substantially identical in construction and mounted approximately 180 degrees in opposition.

10. A net radiometer, comprising:
    a first surface coating substantially absorptive and emissive to long-wave far infrared radiant flux energy and absorptive to short-wave radiant flux energy;
    a second surface coating substantially absorptive and emissive to long-wave far infrared radiant flux energy and substantially reflective to short-wave radiant flux energy;
    a first thermal absorber;
    a first thermal absorber portion including a first outward facing surface coated with the first surface coating;
    a second thermal absorber portion including a second outward facing surface coated with the second surface coating, the first thermal absorber portion and second thermal absorber portion separately formed;
    the first thermal absorber formed by joining of a first thermal absorber portion second thermal absorber portion;
    the first thermal absorber portion and the second thermal absorber portion are sized in a proportion that thermally balances thermal spectral sensitivity of the first thermal absorber to long-wave far infrared radiant flux energy and short-wave radiant flux energy; and
    a second thermal absorber, configured to have substantially identical thermal spectral sensitivity to long-wave far infrared radiant flux energy and short-wave radiant flux energy as the first thermal absorber.

11. A net radiometer of claim 10, wherein:
    the first thermal absorber portion and second thermal absorber portions are joined so that the first outward facing surface and second outward facing surface are concentric.

12. A net radiometer of claim 11, wherein:
    the first outward facing and second outward facing surface are conically pitched at different angles.

13. A net radiometer of claim 10, wherein the first surface coating has a curing temperature different than the second surface coating.

14. A net radiometer of claim 10, wherein the first surface coating has a curing time different than the second surface coating.

15. A net radiometer of claim 14, wherein the first surface coating has a curing temperature different than the second surface coating.

* * * * *

UNITED STATES PATENT AND TRADEMARK OFFICE
CERTIFICATE OF CORRECTION

| | | |
|---|---|---|
| PATENT NO. | : 8,294,101 B2 | Page 1 of 1 |
| APPLICATION NO. | : 12/876117 | |
| DATED | : October 23, 2012 | |
| INVENTOR(S) | : Robert Dolce | |

It is certified that error appears in the above-identified patent and that said Letters Patent is hereby corrected as shown below:

In the drawings:

In FIG. 7, in the uppermost left portion of the drawing, add reference numeral -- 108 -- to lead line missing a numeral.

Signed and Sealed this
Twenty-second Day of January, 2013

David J. Kappos
*Director of the United States Patent and Trademark Office*